(12) United States Patent
Lowe et al.

(10) Patent No.: US 7,172,735 B1
(45) Date of Patent: Feb. 6, 2007

(54) MODULAR MICROREACTION SYSTEM

(75) Inventors: Holger Lowe, Oppenheim (DE); Oliver Hausner, Hamburg (DE); Thomas Richter, Mainz (DE)

(73) Assignee: Institut fur Mikrotechnik Mainz GmbH, Mainz (DE)

( * ) Notice: Subject to any disclaimer, the term of this patent is extended or adjusted under 35 U.S.C. 154(b) by 575 days.

(21) Appl. No.: 10/148,807

(22) PCT Filed: Oct. 28, 2000

(86) PCT No.: PCT/DE00/03844

§ 371 (c)(1),
(2), (4) Date: Sep. 23, 2002

(87) PCT Pub. No.: WO01/41916

PCT Pub. Date: Jun. 14, 2001

(30) Foreign Application Priority Data

Dec. 8, 1999 (DE) .................. 199 59 249

(51) Int. Cl.
*B81B 7/00* (2006.01)
*B81B 7/04* (2006.01)
*B81B 5/00* (2006.01)
*B01J 8/02* (2006.01)

(52) U.S. Cl. ............ 422/188; 422/188; 422/191; 422/193

(58) Field of Classification Search ........... 422/188, 422/191, 193; *B81B 7/00, 7/04, 5/00*
See application file for complete search history.

(56) References Cited

U.S. PATENT DOCUMENTS 5,534,328 A * 7/1996 Ashmead et al. ........... 428/166
5,580,523 A * 12/1996 Bard .................. 422/50

FOREIGN PATENT DOCUMENTS

DE    43 08 697 A1 *  9/1994
DE    199 17 398 A1 * 10/2000
EP    1031375 A2 *  8/2000

* cited by examiner

*Primary Examiner*—Alexa D. Neckel
(74) *Attorney, Agent, or Firm*—Michael L. Dunn

(57) ABSTRACT

A modular microreaction system comprising a housing and functional base modules accommodated therein. The housing has at least one fluid inlet and at least one fluid outlet. The base modules are arranged one behind another in a row in the housing and being designed such that fluid can flow successively through them in series. At least some of the base modules are constructed from a plurality of substantially rectangular foils having plate-like surfaces in essentially parallel planes which foils are connected to one another and are arranged in layers one above another, forming a foil stack. At least a first of the foils having at least one of microstructured channels, sensor elements, heating elements and combinations thereof on a plate-like surface of the at least a first of the foils. Each foil stack also has at least one foil which is provided on a plate-like surface of the at least one foil with channels which are constructed such that for one fluid line they lead from one side of the foil stack to another side of the foil stack. The base modules (2, 2', 2") each have at least one frame element (10), which is arranged essentially perpendicular to planes of the foils, and is connected to the foil stack in a fluid-tight manner and the foil stacks, together with the frame elements, form base elements that can be inserted into and removed from the housing (1) as a unit.

20 Claims, 6 Drawing Sheets

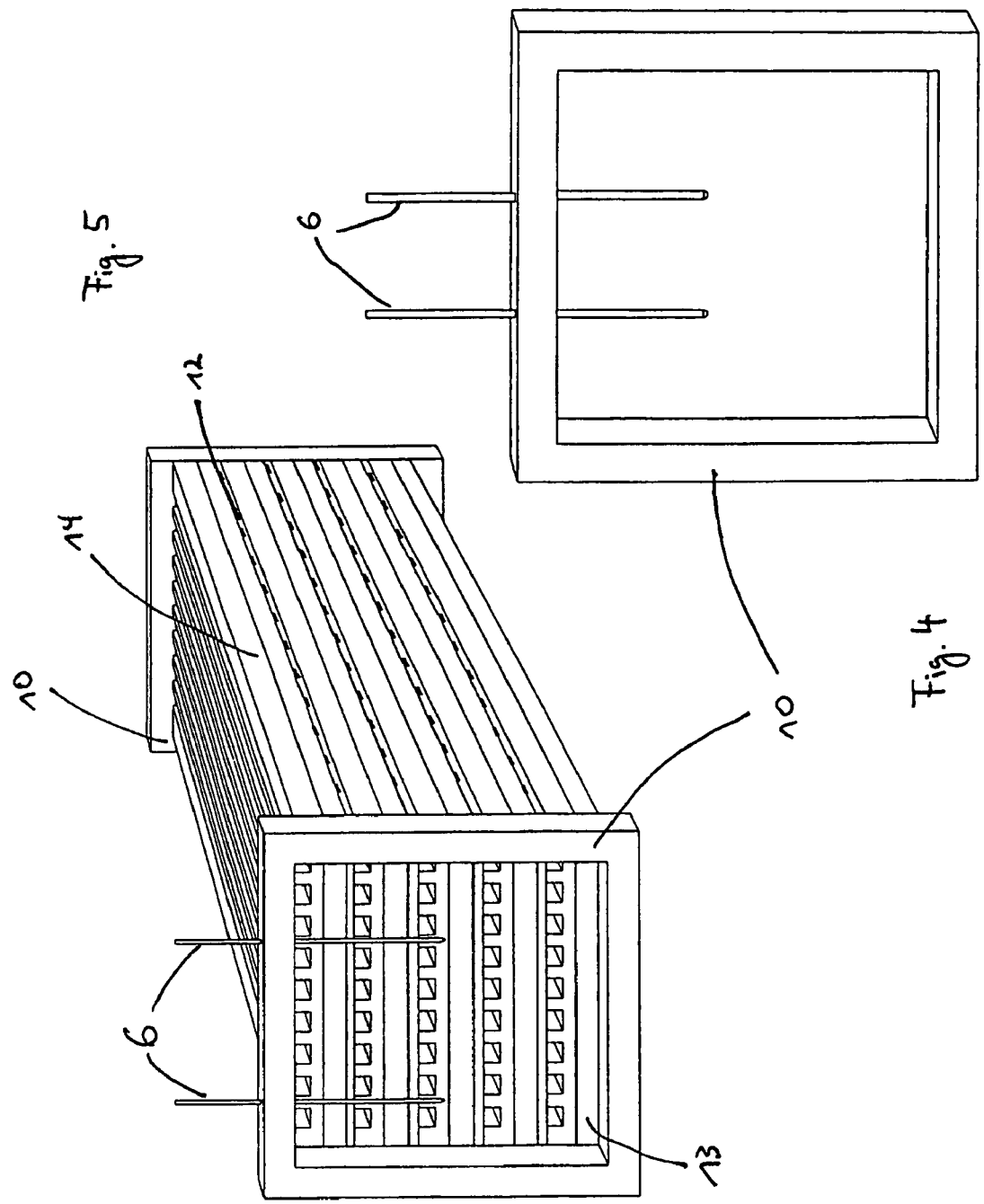

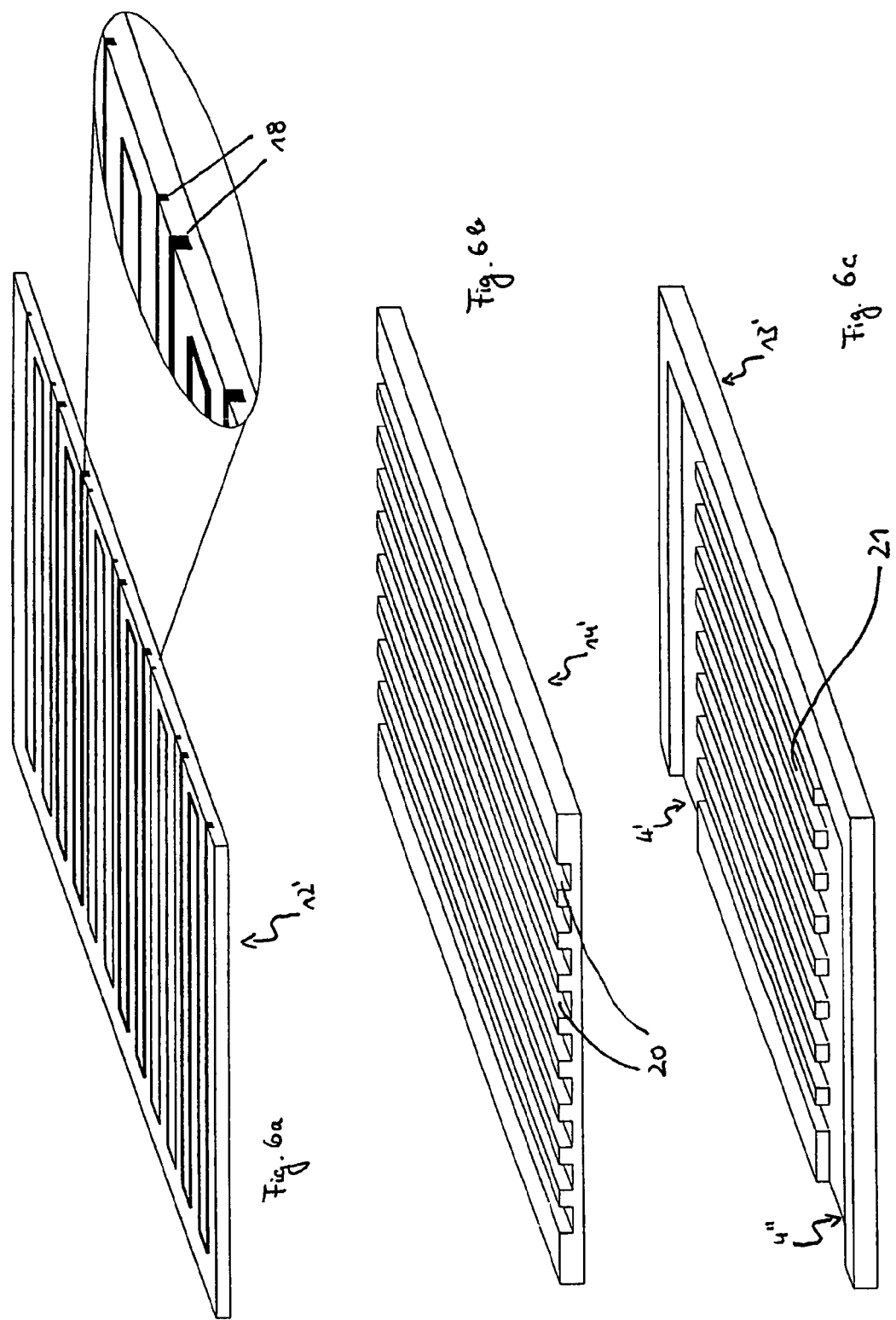

MODULAR MICROREACTION SYSTEM

This application is a national stage filing under 35 U.S.C. 371 of International Application No. PCT/DE00/03844, filed Oct. 28, 2000 and claims priority to German Patent Application No. 199 59 249.7, filed Dec. 8, 1999.

The invention relates to a modular microreaction system which is suitable for performing liquid- or gas-phase reactions, for mixing, cooling, heating of fluids or combinations thereof.

The microreaction system according to the invention has a housing and functional base modules accommodated therein, the housing having at least one fluid inlet and at least one fluid outlet, and the base modules being arranged one behind another in a row in the housing and being designed such that fluid can flow successively through them. At least some of the base modules are constructed from a plurality of plate-like, substantially rectangular foils which are permanently or detachably connected to one another and are arranged in layers one above another, forming a foil stack, one or more of the foils having microstructured channels, sensor elements, heating elements or combinations thereof on one or both surfaces. In addition, each foil stack has at least one foil which is provided on its surface with channels which are constructed such that for one fluid line they lead from one side of the foil stack to the opposite side or to an adjacent side of the foil stack.

BACKGROUND OF THE INVENTION

DE-A 197 48 481 has disclosed a microreactor which is suitable in particular for performing heterogeneous gas-phase reactions. The microreactor comprises an elongate housing with two gas inlets, which are arranged opposite each other in the housing side walls. The gas inlets each open into a feed chamber, which is arranged on both sides of a guide component. The guide component comprises foils of at least two types A and B which are provided with grooves and which, when they are arranged one above another in a layer, each form a family of channels which deflect the gases flowing into the guide component on both sides of the gas inlet openings through 90° to a mixing chamber which adjoins the guide component, where the two gases supplied can be mixed. The mixing chamber is followed by a reaction section, which likewise comprises plate-like elements provided with grooves and arranged one above another in layers and connects the mixing chamber to an outlet chamber provided behind the reaction section. The grooves or channels in the reaction section are coated with a catalyst material or consist of such a material. Behind the outlet chamber, the housing of the microreactor has an outlet opening, through which the product gas is led out. The plate-like elements of the guide component and of the reaction section may be replaced by being removed individually from the housing and replaced by other elements. In order to prevent movement of the plate-like elements in the longitudinal direction of the housing or sideways, and therefore to prevent the gases flowing through flowing past the stacks of plate-like elements, the housing interior is matched exactly to the dimensions of the plate-like elements. The substantially rectangular interior of the housing has recesses which broaden the interior at the points where the plate-like elements are inserted. Length and width of the recesses in the housing interior are dimensioned such that they accommodate the plate-like elements exactly. The housing is therefore designed for accurately fitting insertion with regard to length and width of the plate-like elements.

One disadvantage of this known microreactor consists in the fact that only plate-like elements whose length and width correspond exactly to the recesses provided in the housing can be inserted into the housing. Furthermore, no more or fewer stacks of plate-like elements can be inserted into such a housing than is predefined by the housing configuration. A further disadvantage of this known microreactor consists in the fact that the plate-like elements often expand and distort during operation. Since the expansion is limited by the housing wall and the recesses provided therein, first of all the plate-like elements buckle under the pressure of the expansion, and therefore a gas-impermeable seal between the individual elements is no longer guaranteed. Furthermore, the plate-like elements press into the housing wall or jam and can subsequently no longer be removed from the housing, or only with a great deal of trouble.

It was therefore an object of the present invention to overcome the aforementioned disadvantages of the prior art and to provide a variable, simple to handle microreaction system.

BRIEF SUMMARY OF THE INVENTION

This object is achieved by a modular microreaction system of the type mentioned at the beginning which is characterized in that the base modules which have a foil stack each have at least one frame element, which is connected permanently or detachably to the foil stack in a fluid-tight manner and the foil stacks, together with the frame element connected thereto, can be inserted into and removed from the housing as a unit.

The inner walls of the housing are not provided with specific recesses for the individual base modules, but are substantially smooth or have a pattern for positioning the frame elements. Such a pattern can be implemented by means of regularly spaced projections or depressions on the housing inner wall. In the longitudinal direction of the housing, the base modules can be inserted in any desired number and any desired sequence in the manner of a building-block system. The number of base modules that can be inserted is limited only by the overall length of the housing. Depending on the requirement, for example, modules which contain a reaction section and have various lengths can be used in the same housing. In this way, for example, different residence times in the reaction section can be implemented in one and the same housing of a microreaction system.

The outer circumference of the frame elements expediently corresponds to the inner cross section of the housing and rests in a fluid-tight manner on the housing inner wall. Since the foil stacks are also connected in a fluid-tight manner to the frame elements, this results in sealing with respect to fluid flowing past the foil stack of a base module. In addition, a sealing material can also be provided between the frame circumference and the housing inner wall, such as a graphite foil seal or an inserted sealing element.

In connection with this invention, "foil" means a plate-like element, which normally has a substantially rectangular shape. The foils or plate-like elements used for the present invention are preferably composed of metal, metal alloys or stainless steel, foils of silicon or silicon nitride ($SiN_x$) also being suitable, depending on the application and intention. The latter are used in particular as a base for resistance heating elements and sensors. Particularly preferred metals or metal alloys are gold, silver, copper, nickel, nickel-cobalt alloys and nickel-iron alloys. Suitable foil materials are also ceramics and plastics, such as polytetrafluoroethylene (PTFE), polyetheretherketones (PEEK) or cycloolefin copolymers (COC). The foils have a thickness of about 0.05 mm up to a few millimeters.

The connection between the foils stacked one above another and the connection between frame and foil stack are expediently carried out by means of welding or soldering, preferably laser welding, laser soldering, electron beam welding, microdiffusion welding, or by means of adhesive bonding or joining via ceramic intermediate layers, such as green ceramic foils. The foils in a foil stack are connected to one another in such a way that fluid can flow only through the channels provided for the purpose and cannot emerge at undesired points between two foils. A fluid-tight connection can also be achieved by pressing the foils firmly onto one another. The microstructuring of the foils, in particular the application of channels to their surfaces, is carried out by means of etching, milling or spark erosion. Particularly suitable methods are LIGA or laser LIGA. Foils of polymer materials are preferably produced by molding processes.

In connection with this invention, "channels" or "microchannels" mean groove-like depressions in one or both surfaces of a foil. The width of such channels lies in the range from 1 to 1000 μm, preferably 5 to 500 μm. A large number of channels are usually arranged beside one another, often in parallel, but in some cases also running otherwise, however. The aspect ratio refers to the ratio of the depth of a channel to its width. The aspect ratio of the microchannels is usually 1 or less.

The designations "in front of" and "behind" a base module, a foil stack and so on refer to a relative position in relation to the longitudinal axis of the housing, the side of the fluid inlet being at the front and the side of the fluid outlet being at the rear.

It is particularly preferred for base modules having a foil stack to comprise at least two frame elements, which are arranged on opposite sides of the foil stack. The further the frame elements are arranged at the end of a foil stack, the smaller is the dead space between housing wall and foil stack, into which fluid can flow.

In an embodiment that is particularly preferred according to the invention, the outer circumference of the frame elements, at least partially, but preferably over the entire circumference, is greater than the circumference of the foil stack. In this embodiment, the frame elements additionally function as spacers, so that the foil stack has only partial contact or no contact at all with the housing wall. This ensures good thermal and electrical insulation of the foil stack with respect to the housing wall. It is often expedient to use two base modules at very different temperatures. For example, reactions in the base module containing the reaction section are often carried out at very high temperatures and then, in a following region of the reaction system, the reaction products are to be cooled down sharply, in particular if the reaction products are thermally unstable. If the foil stacks of the base modules touch the housing wall, both of which are usually produced from metal and are thermally highly conductive, then a severe exchange of heat takes place between the modules via the housing wall. The distance between foil stacks and housing wall, ensured by the configuration of the frame elements, reduces such heat exchange to a considerable extent. It is therefore also particularly expedient if the frame elements are produced from a thermally insulating material. Ceramic materials are particularly suitable for this purpose.

It is particularly preferable if two frame elements of two base modules arranged one behind another in the housing rest on each other and form a cavity, which is bounded on four sides by the inner faces of the frame openings and on two sides in each case by one side of the foil stacks connected to the frame. Such a cavity can be used, for example, for mixing a plurality of fluids between two base modules, if a plurality of fluids flow simultaneously through a base module, as is the case in mixer modules. Such a cavity will also be referred to below as a diffusion section. The volume of such a cavity or of such a diffusion section is determined by the size of the frame opening and the depth of the frame opening as far as the foil stack fixed to the latter. If the frame is at least partly pushed over a foil stack, or if a foil stack is inserted into the frame opening, then the size of the frame opening in this area is predefined by the outer circumference of the foil stack. In order to reduce the size of the cavity or of the diffusion section, it is therefore expedient if the circumference of the frame element decreases or tapers from the area in which the foil stack is inserted to the area which is in contact with the frame element of the next base module. This is expediently carried out by means of a graduated reduction in the size of the frame opening. The foil stack is then seated in the area of the frame opening with the larger inner circumference and, at the same time, at the front rests on the graduation in the frame opening. In addition, improved fluid sealing between frame element and foil stack is achieved by the additional contact area.

It is frequently necessary to determine the pressure and/or the temperature of a fluid flowing through the system before or after a base module, in order only to register these parameters or else to regulate them. In a preferred embodiment of the invention, the frame elements have pressure sensors and/or temperature sensors for this purpose. Pressure and temperature sensors can be inserted into the area of the frame opening through holes in the frame.

The functional base modules of the microreaction system according to the invention are designed to carry out various tasks. Furthermore, the individual base modules in the foil stacks likewise contain various functional elements, which fulfill different functions in a base module. The function of the individual subelements in a foil stack is determined by the structure of the individual foils, such as microstructuring and construction of additional functional components, for example resistance heating elements or sensors. The functions which an individual base module satisfies are achieved by means of selection and layer sequence of the various foils or functional subelements and can be adapted individually to specific requirements. It is also possible for a large number of very different functional base modules to be provided commercially, so that the user can assemble the microreaction system in accordance with his needs from a large selection of individual elements. He needs only one housing and, depending on his requirements, combines this housing with the necessary functional base modules. The microreaction system according to the invention therefore offers the maximum level of variability and saves considerable costs, since a complete, dedicated system is not needed for each requirement.

In the following text some functional subelements which are particularly expedient according to the invention for a foil stack in a base module are described. These can in each case be contained in a foil stack in any desired layer sequence, as individual functional elements or those combined with others. For example, for a mixer module, a reaction section or else a pure cooling or heating module, it is expedient for one or more of the foils in the foil stack to be constructed as fluid guide elements which on their surface have channels which are arranged such that they lead a fluid which flows in from a fluid inlet or from an adjacent base module from that side of the foil stack at which the fluid flows in through the channels to the opposite side and out of the latter. For the cooling or heating of the fluids flowing through a fluid guide element, it is also expedient if one or more of the foils in the foil stack is/are constructed as heat transfer elements which on their surface have channels and at least one inlet opening and an outlet opening for a cooling or heating fluid, the fluid-carrying areas of the heat transfer elements being sealed off against flooding of fluid with respect to the fluid-carrying areas of the fluid guide elements. Such heat transfer elements are expediently arranged immediately above and/or below fluid guide elements in the foil stack. In order to heat the fluid flowing through a module, other heating devices can also be fitted to the foils, such as electric resistance heating elements or the like. If temperature or pressure is to be measured or regulated in the interior of a base module, then foils with appropriate sensor elements can be provided for this purpose. Suitable temperature sensors are electric resistance elements and thermocouple elements, but fiber-optic temperature measuring elements and membrane infrared sensors are also known and suitable for such microtechnical applications. Furthermore, mass flow sensors can be accommodated in a foil stack and detect and/or regulate the quantity of fluid flowing through. Known microtechnical mass flow sensors are based on the fact that, between two temperature sensors in the fluid flow, an electric resistance heating element is arranged, which heats the fluid flowing in from the first temperature sensor, and the temperature of the fluid is measured downstream of the second temperature sensor. A comparison of the two measured temperatures supplies a measure of the flow rate which, taking into account the channel cross section, supplies a measure of the mass flow.

In a further preferred embodiment of the invention, mass flow controllers are arranged at the fluid inlets and/or outlets of the housing. The mass flow controllers comprise a mass flow sensor and a valve for controlling the mass flow and also appropriate regulating and actuating electronics. Because of the larger dimensions at the fluid inlets and outlets than is the case within the foil stacks of the base modules, miniaturized mass flow sensors can be used here.

In order to perform reactions with a plurality of educt fluids, or if one or more educt fluids is/are to be mixed with an inert fluid as a carrier or for dilution, it is expedient if at least one base module in the reaction system is constructed as a fluid mixer which in the foil stack has channels which lead from a fluid inlet of the housing to a mixing chamber, which is preferably a cavity or a diffusion section between the fluid mixer and a base module arranged to follow the latter in the housing. In order to mix a plurality of fluids, which flow into the system from various fluid inlets, a plurality of base modules constructed as fluid mixers can be arranged one behind another. However, a fluid mixer can also be constructed in such a way that three or more fluids can flow into this fluid mixer simultaneously and are led into the mixing chamber.

A base module constructed as a reaction section has in the foil stack channels which lead from a base module arranged before the reaction section in the housing to a base module arranged behind it, to a chamber or to a fluid outlet. A particularly preferred application of the microreaction system according to the invention is the investigation and performance of heterogeneously catalyzed gas-phase reactions. For this purpose, the channels of the reaction section are preferably provided with a catalyst, and if necessary, with a carrier coating containing the catalyst. Suitable catalysts are noble metals, in particular platinum. The channels of the reaction section are expediently coated with the catalyst material for this purpose. Alternatively, the foils can also be produced completely from the catalyst metal. A carrier layer between channel surface and catalyst is suitable to promote adhesion between catalyst and foil material and/or also to enlarge the catalytic surface. A suitable carrier layer is, in particular, aluminum oxide ($Al_2O_3$), but a large number of other carrier materials which can be used in accordance with the invention are also known from the prior art.

A layer structure which is particularly preferred according to the invention of a foil stack for a reaction section has a) alternating heat transfer elements and fluid guide elements, b) alternating heat transfer elements, fluid guide elements and sensor elements or c) alternating heat transfer elements, fluid guide elements and combined sensor/heating elements.

Electric resistance heating elements can be applied to the foils as a wire or as thin metal layers. Suitable temperature sensors are resistance elements or thermocouple elements constructed in a similar way, but fiber-optic temperature sensors in a microtechnical configuration are also known.

The housing of the microreaction system according to the invention is expediently constructed substantially like a box, with a lower housing part and a housing cover. After the base modules have been inserted into the lower housing part, the housing is firmly closed with the cover, so that the frame elements of the base modules have accurately fitting and fluid-tight contact with the housing cover in the same way as in the interior of the lower housing part. For the purpose of fixing, the housing cover can be screwed to the lower part or pressed on in another way. The housing is preferably substantially produced from metal but ceramic is also suitable, in particular if thermal and/or electrical insulation is required.

For the supply of heating or cooling fluid and also for electrical feed and return lines for electric heating elements and sensors, the housing has appropriate connections in the housing wall. These connections are preferably constructed as a connecting strip extending over part or the entire length of the housing and having a large number of connections arranged one beside another, which can be used as required and depending on the base modules arranged behind them in the housing. However, a plurality of connecting strips can also be provided on the housing wall, for example one connecting strip for electric contacts and a further connecting strip with feed and return lines for heat transfer elements.

Further advantages, features and embodiments of the invention will become clear by using the following description of some preferred exemplary embodiments and the associated figures.

BRIEF DESCRIPTION OF THE DRAWINGS

FIG. 4 shows a frame element according to the invention with sensors.

FIG. 5 shows a base module according to the invention with a foil stack and frame elements.

FIGS. 6a, 6b and 6c show a heating element, a fluid guide element and a heat transfer element.

DETAILED DESCRIPTION OF THE INVENTION

Figure 1:
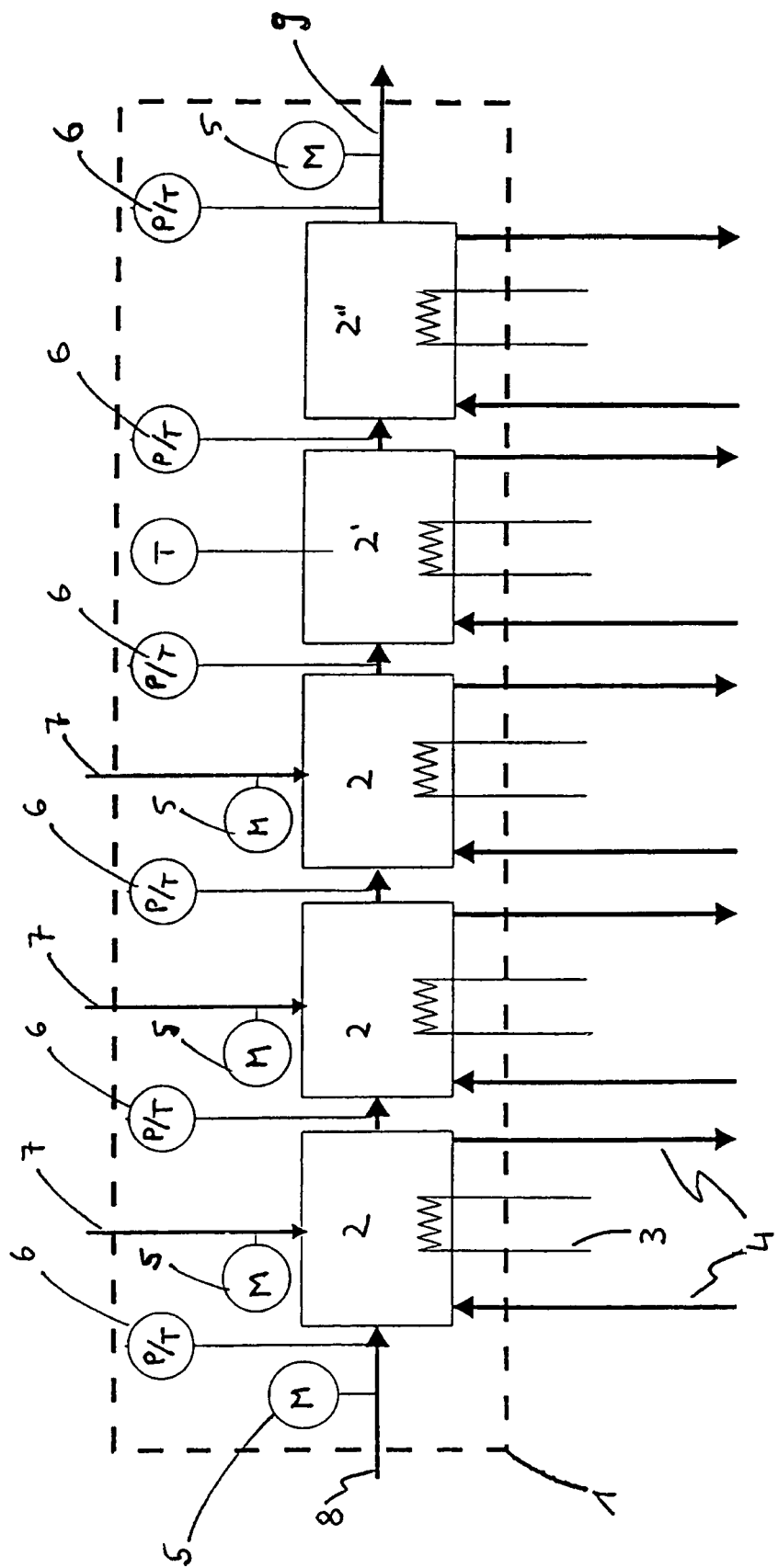
FIG. 1 shows a schematic diagram of the arrangement of various elements of a microreaction system according to the invention.

FIG. 1 reproduces the arrangement of the individual elements of a microreaction system according to the invention schematically. The housing 1, represented by a broken line, has three educt gas inlets 7, an inert gas inlet 8 and a product gas outlet 9. Arranged in the interior of the housing, one behind another, are functional base modules 2, 2' and 2", specifically mixer modules 2, a reaction section 2' and a quench module (cooling or heating module) 2". Provided at the inlets and outlets 7, 8 and 9 of the housing 1 in each case are mass flow controllers 5, which measure the gas flow and control it by driving valves. Furthermore, pressure and temperature sensors 6 are provided in front of and behind the individual base modules 2, 2' and 2" and are used to register and/or control these parameters. Each of the base modules 2, 2' and 2" illustrated is equipped with heat transfer elements, which can be supplied with cooling or heating fluid (gas or liquid) via feeds and returns 4, in order to set the temperature in the base modules. Furthermore, each of the base modules 2, 2' and 2" illustrated is equipped with electric resistance heating elements 3.

Figure 2:
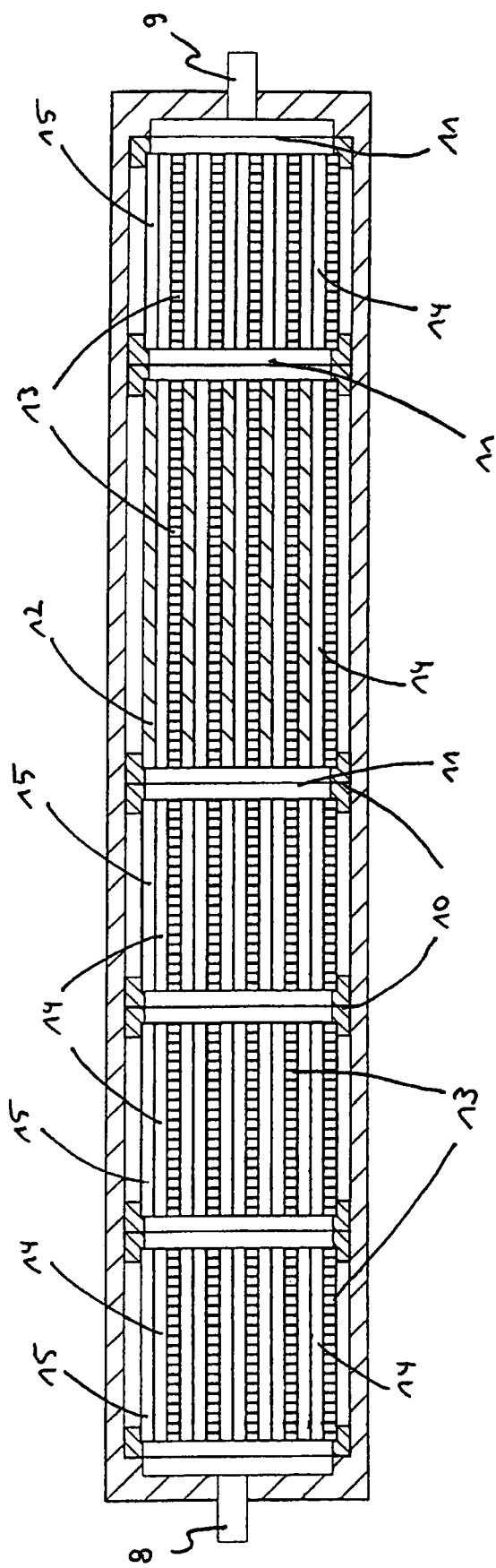
FIG. 2 shows a longitudinal section through a microreaction system according to the invention.

FIG. 2 shows a concrete configuration according to the invention of the modular microreaction system illustrated in FIG. 1 in longitudinal section from the side. The fluid inlets 7 illustrated in FIG. 1 are located on the side of the housing 1 facing away from the observer in the embodiment illustrated in FIG. 2 and are therefore not visible in FIG. 2. Accommodated in the housing 1 in FIG. 2, as in FIG. 1, are five base modules, namely, in the direction from the fluid inlet 8 to the fluid outlet 9, three successive mixer modules 2, a reaction section 2' and a quench module 2". Each of the base modules comprises a foil stack having plate-like foils 12, 13, 14, 15 arranged one above another and two frame elements 10, which are connected to the foil stack at the front and rear side (as based on the main fluid flow direction). The outer circumference of the frame elements 10 corresponds to the internal cross section of the housing 1, so that the frame elements rest with an accurate fit and in a substantially fluid-tight manner on the housing inner wall. The frame elements 10 are configured in such a way that they enclose the foil stack connected to them with an area of the frame opening but also extend in the main fluid flow direction until in front of the foil stack. Here, the inner cross-sectional area of the frame opening in front of a foil stack is smaller than in the area enclosing the foil stack, the transition from the larger to the smaller inner cross section running over a graduation. Two adjacent base modules are arranged beside each other in such a way that the front faces of their frame elements come to rest on each other, a cavity or a diffusion section 11 being produced between adjacent base modules. The mixer modules 2 of the embodiment illustrated in FIG. 2 each have three different types of foils in successive layers, namely heat transfer elements 13, fluid guide elements 14 and educt fluid feed elements 15. The educt fluid feed elements 15 lead an educt inlet, not illustrated in FIG. 2 and designated by the reference symbol 7 in FIG. 1, to the diffusion section 11 behind the corresponding mixer module 2. The fluid guide elements 14 carry a further fluid, which is introduced through the fluid inlet 8, through the foil stack, likewise to the diffusion section 11. The heat transfer elements 13 can be fed with a heating or cooling fluid via fluid feeds, not illustrated, in order to cool or to heat the fluids flowing through the mixer module. The fluids guided through the module mix in the diffusion section 11 before they flow into the next base module. In the second and third mixer module, the fluids introduced via the first mixer module can be mixed with further educt fluids, optionally also with an inert fluid.

The reaction section 2' likewise has three types of foils, namely heat transfer elements 13, fluid guide elements 14 and sensor/heating elements 12. The fluid guide elements 14 of the reaction section 2', which connect the diffusion sections 11 in front of and behind the reaction section 2' to each other, can optionally contain a catalyst material. The foils 14 provided with microstructured channels can in this case either be produced completely from the catalyst material, such as noble metal, or the microstructured channels are coated with the catalyst material. The heat transfer elements 13 are equipped in the same way as in the case of the mixer modules 2. The sensor/heating elements 12 are equipped as required with temperature sensors, electric resistance heating elements or both. They can also contain microtechnical pressure sensors. The quench module 2" following the reaction section 2' is constructed in substantially the same way as a mixer module 2, namely from heat transfer elements 13, fluid guide elements 14 and fluid feed elements 15, the reaction products flowing in from the reaction section being guided through the fluid guide elements 14 into a chamber 11' immediately in front of the fluid outlet 9. In addition, a quenching fluid can be fed through the fluid feed elements 15 in the quench module 2" and can be used for example for rapid cooling, dilution or stabilization of the reaction products. Quenching fluid and reaction products are brought together in the chamber 11' and mixed there before they flow out of the housing through the fluid outlet 9.

The various base modules 2, 2', 2" may easily be removed from the housing and replaced by other base modules. By replacing the reaction section 2', for example, different catalysts or other reaction conditions can be investigated, without the other base modules having to be replaced or a completely new reaction system having to be used. It is also possible for base modules to be left out, such as one or two of the mixer modules 2. For this purpose, others of the base modules 2, 2', or 2" in a longer embodiment can be inserted in order to fill up the remaining empty space in the housing 1. Alternatively, in order to fill up the empty space, other elements, such as simple frame elements 10 or spacers similar to the frame elements can be inserted.

Figure 3:
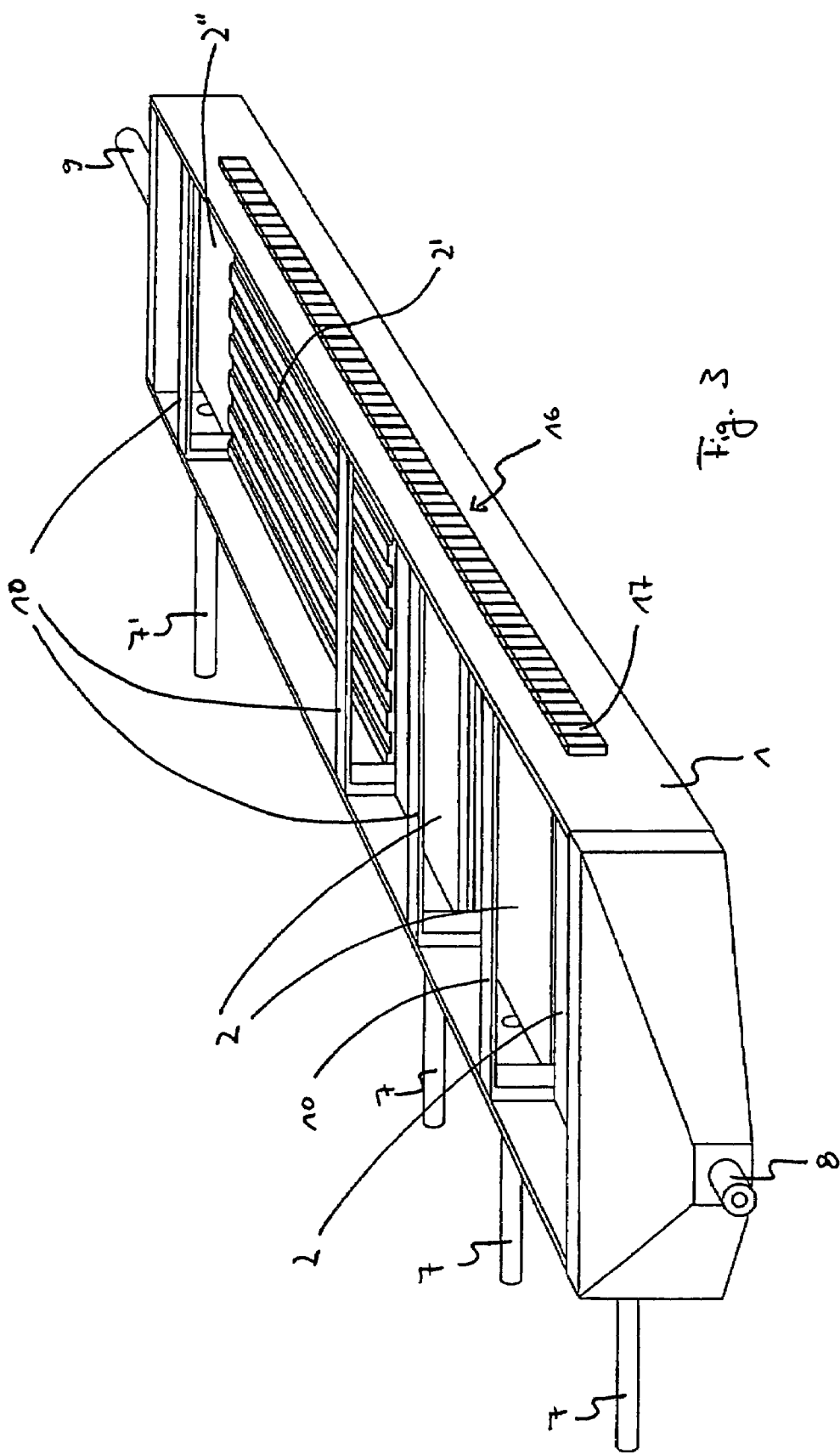
FIG. 3 shows a further embodiment of the microreaction system according to the invention obliquely from the front.

FIG. 3 shows a further embodiment of the microreaction system according to the invention in a perspective illustration obliquely from the front. The microreaction system has substantially the same types of base modules as the embodiment according to FIG. 2, namely mixer modules 2, a reaction section 2' and a quench module 2". In the area of the quench module 2", a fluid feed 7' for the introduction of quenching fluid into the quench module 2" is additionally illustrated. Provided on the side wall of the housing 1 is a connecting strip 16 having a large number of connections 17 arranged beside one another. Via the connections 17, the base modules arranged behind them can be supplied with power, for example for electric resistance heating elements, or with fluid, for example for the heat transfer elements.

FIG. 4 shows a frame element 10 according to the invention, in which sensors 6 are inserted into the frame opening through holes in the frame. The sensors 6 can be pressure and/or temperature sensors. FIG. 5 shows a base module according to the invention having a foil stack and frame elements 10 from FIG. 4 arranged on the front and rear of the foil stack. The foil stack comprises fluid guide elements 14 having micro-structured channels, which extend in a family parallel and in a straight line from the front to the rear of the foil stack. Furthermore, the foil stack comprises sensor/heating elements 12 and heat transfer elements 13. The base module from FIG. 5 is suitable as a reaction section.

FIGS. 6a, 6b and 6c show a heating element 12', a fluid guide element 14' and a heat transfer element 13' which are suitable for a joint arrangement in a foil stack. The heating element 12' from FIG. 6a comprises a substantially rectangular plate through whose surface electric resistance heating wires are drawn. At one of the side faces of the heating element 12, the heating wires end in connections 18, where they are fed with power. The connections 18 are preferably formed as bond pads, as they are known.

The fluid guide element 14' from FIG. 6b is provided with a family of groove-like microchannels 20 which run parallel and extend from one side of the fluid guide element to the opposite side. By means of the foil arranged above the fluid guide element in a foil stack, the individual groove-like channels are closed in a fluid-tight manner from above in order to prevent flooding of fluid into an adjacent channel or laterally out of the foil stack. In the heat transfer element 13' illustrated in FIG. 6c, a cooling or heating fluid is introduced through a feed 4', led through the heat transfer element 13' through microstructured heat transfer channels 21 and led away again through a return 4".

Figure 7A:
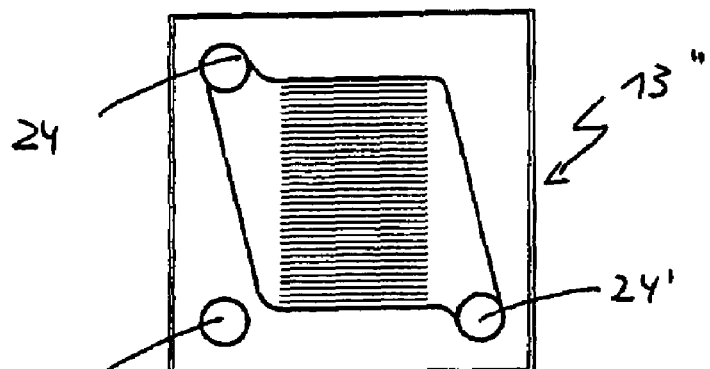
FIGS. 7a, 7b and 7c show a heat transfer element, an educt feed element and a fluid guide element in alternative embodiments.
Figure 7B:
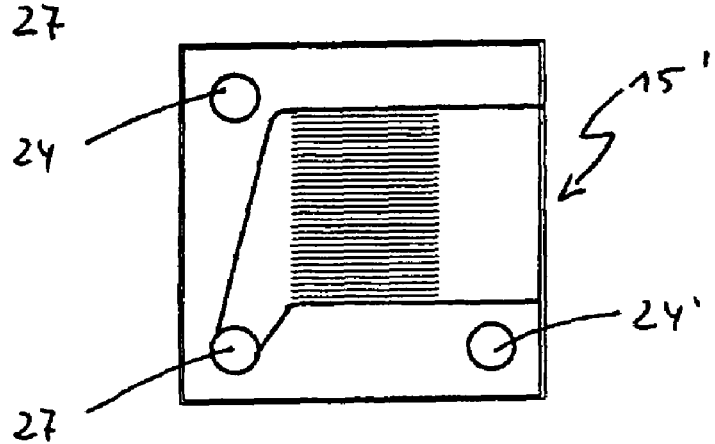
Figure 7C:
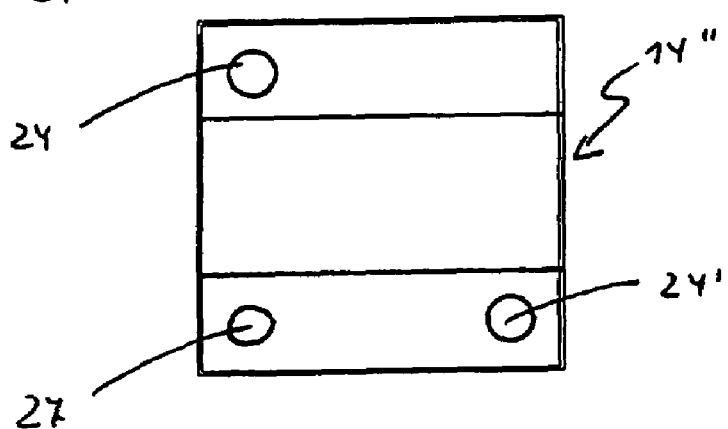

FIGS. 7a, 7b and 7c show alternative configurations of microstructured foil elements, namely a heat transfer element 13", a fluid feed element 15' and a fluid guide element 14", which are suitable for a joint arrangement in a foil stack. The foil elements 13", 15' and 14" are each provided with three holes, which come to lie one above another in a foil stack and extend from top to bottom through the foil stack. The holes 24 and 24' are used as a feed and return for heat transfer media and are connected only to the microstructured area of the heat transfer element 13", but not to the microstructured areas of the fluid feed elements 15' and of the fluid guide elements 14". The foil elements of FIGS. 7a, 7b, and 7c are provided for a feed of fluid from the top into a foil stack. Cooling or heating fluid is led in through the heat transfer feed 24, flows exclusively through one or more of the heat transfer elements 13" provided in the foil stack and leaves the foil stack through the heat transfer return 24'. Educt fluid is led into the foil stack through the fluid feed hole 27, flows through this hole into the respective fluid feed elements 15 in a stack and leaves the stack in the direction of the next adjacent base module. The fluid guide element 14" receives flow from the left-hand side in FIG. 7c and leads the fluid through to the right-hand side, where it can mix, in an adjacent diffusion section, with the fluid emerging from the fluid feed element 15'.

List of designations

| | |
|---|---|
| 1 | Housing |
| 2 | Mixer module |
| 2' | Reaction section |
| 2" | Quench module |
| 3 | Heating wire |
| 4, 4', 4" | Heat transfer feed/return |
| 5 | Mass flow controller |
| 6 | Pressure/temperature sensors |
| 7, 7', 7" | Educt fluid feeds |
| 8 | Inert fluid feed |

-continued
List of designations

| | |
|---|---|
| 9 | Fluid outlet |
| 10 | Frame element |
| 11 | Diffusion section |
| 12, 12', 12" | Sensor/heating element |
| 13, 13', 13" | Heat transfer element |
| 14, 14', 14" | Fluid guide element |
| 15, 15' | Fluid feed element |
| 16 | Connecting strip |
| 17 | Connections |
| 18 | Heating element connections |
| 20 | Reaction channels |
| 21 | Heat transfer channels |
| 22 | Manifold |
| 24, 24' | Heat transfer feed/return holes |
| 27 | Educt fluid feed hole |

The invention claimed is:

1. A modular microreaction system comprising a housing and functional base modules accommodated therein, the housing having at least one fluid inlet and at least one fluid outlet, the base modules being arranged one behind another in a row in the housing and being designed such that fluid can flow successively through them in series, and at least some of the base modules being constructed from a plurality of, substantially rectangular foils having plate-like surfaces in essentially parallel planes which foils are connected to one another and are arranged in layers one above another, forming a foil stack, at least a first of the foils comprising at least on of microstructured channels, sensor elements, heating elements and combinations thereof on at least one plate-like surface of the at least a first of the foils and each foil stack having at least one foil which is provided on a plate-like surface of the at least one foil with channels which are constructed such that for one fluid line they lead from one side of the foil stack to another side of the foil stack, wherein the base modules (2, 2', 2") each have at least one frame element (10), which is arranged essentially perpendicular to planes of the foils and is connected to the foil stack in a fluid-tight manner and the foil stacks, together with the frame elements, form base elements that, can be inserted into and removed from the housing (1) as a unit.

2. The system of claim 1, wherein the foil stack is detachably connected to frame element 10.

3. The system as claimed in claim 1, wherein an outer circumference of the frame elements (10) corresponds to an inner cross section of the housing (1) and rests in a fluid-tight manner on a housing inner wall.

4. The system as claimed in claim 1, wherein a base module (2, 2', 2") comprises at least two frame elements (10), which are arranged on opposite sides of a foil stack.

5. The system as claimed in claim 3, wherein the outer circumference of the frame elements (10) and the inner cross section of the housing (1) are rectangular.

6. The system as claimed in claim 3, wherein the outer circumference of the frame elements (10) connected to foil stacks is greater than the circumference of the foil stacks in the direction of the longitudinal axis of the housing.

7. The system as claimed in claim 1, wherein the frame elements (10) are produced from thermally insulating material.

8. The system as claimed in claim 1, wherein adjacent frame elements (10) of two base modules (2, 2', 2") arranged one behind another in the housing (1) rest on each other and form a cavity (11), which is bounded on four sides by inner faces of the frame openings and on two sides in each case by sides of the foil stacks connected to the frames.

9. The system as claimed in claim 1, wherein the frame elements (10) have at least one of a pressure sensor and temperature sensor (6) in the frame opening.

10. The system as claimed in claim 1, wherein at least one of the foils in a foil stack is constructed as a fluid guide element which on a surface has at least one channel which leads from a side of the foil stack at which fluid flows into said foil stack to an opposite side of the foil stack.

11. The system of claim 1, wherein at least one of the foils in a foil stack is constructed as a heat transfer element having at least one channel on its surface and at least one inlet opening and an outlet opening for a cooling or heating fluid, fluid-carrying areas of the heat transfer elements being sealed off against flooding of fluid with respect to the fluid-carrying areas of the fluid guide elements.

12. The system of claim 1, wherein at least one of the foils in a foil stack is constructed as a temperature sensor element, pressure sensor element, heating element, or a combination thereof.

13. The system as claimed in claim 1, wherein at least one base module is constructed as a fluid mixer which a contained foil stack has channels which lead from a fluid inlet of the housing to a mixing chamber said mixing chamber being a cavity between the fluid mixer and a further base module arranged to follow the fluid mixer in the housing.

14. The system as claimed in claim 13, wherein the fluid mixer further comprises channels which lead to the mixing chamber from a fluid inlet of the housing or from a base module arranged before the fluid mixer in the housing.

15. The system as claimed in claim 1, wherein at least one base module is constructed as a reaction section which in the foil stack has channels which lead from a base module arranged before the reaction section in the housing to a base module arranged behind the reaction section or to a fluid outlet.

16. The system as claimed in claim 15, wherein the channels of the reaction section are provided with a catalyst and with a carrier coating arranged between a channel surface and the catalyst.

17. The system as claimed in claim 1, wherein the housing is produced from metal.

18. The system as claimed in claim 1, wherein the housing is produced from ceramic.

19. The system as claimed in claim 1, wherein electrical connections, fluid connections and mixtures thereof are provided on the housing wall.

20. The system as claimed in claim 19, wherein connections provided on the housing wall are constructed as a connecting strip (16).

* * * * *